United States Patent
Mayfield

(10) Patent No.: US 9,321,978 B1
(45) Date of Patent: *Apr. 26, 2016

(54) FIRE KINDLER

(71) Applicant: Robert Nicholas Mayfield, Williams, AZ (US)

(72) Inventor: Robert Nicholas Mayfield, Williams, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/545,473

(22) Filed: May 7, 2015

Related U.S. Application Data

(63) Continuation-in-part of application No. 13/506,841, filed on May 17, 2012, now Pat. No. 9,200,227.

(51) Int. Cl.
  *C10L 5/36* (2006.01)
  *C10L 11/06* (2006.01)
  *C10L 11/04* (2006.01)

(52) U.S. Cl.
  CPC .................. *C10L 11/06* (2013.01); *C10L 11/04* (2013.01); *C10L 2200/0469* (2013.01); *C10L 2230/06* (2013.01)

(58) Field of Classification Search
  CPC ........... C10L 5/36; C10L 5/365; C10L 11/00; C10L 11/06
  USPC ..................................... 44/530, 532, 533, 535
  See application file for complete search history.

(56) References Cited

U.S. PATENT DOCUMENTS

| | | | |
|---|---|---|---|
| 57,890 A * | 9/1866 | Gilson | ....................... C10L 5/36 44/491 |
| 182,087 A | 9/1876 | Tylee | |
| 201,184 A | 3/1878 | Lewis | |
| 211,085 A | 1/1879 | Burnett | |
| 213,768 A | 4/1879 | McShane | |
| 286,103 A | 10/1883 | Wood et al. | |
| 585,001 A | 6/1897 | McDonald | |
| 829,072 A | 8/1906 | Hill | |
| 2,007,694 A | 7/1935 | Rutherford | |
| 3,346,352 A | 10/1967 | McCoy | |
| 4,060,396 A | 11/1977 | Burton | |
| 4,116,645 A | 9/1978 | Dalzell | |
| 4,243,394 A * | 1/1981 | Kincaid | ................. B65D 85/62 44/520 |
| 4,460,377 A | 7/1984 | Kalil | |
| 4,781,128 A | 11/1988 | Salner | |
| 4,818,249 A * | 4/1989 | Barrett, Jr. | ................. C10L 5/44 428/905 |

(Continued)

FOREIGN PATENT DOCUMENTS

| | | |
|---|---|---|
| GB | 402838 A | 12/1933 |
| GB | 839602 A | 6/1960 |
| WO | WO0018855 A1 | 4/2000 |

*Primary Examiner* — Nina Bhat

(57) ABSTRACT

A fire kindler (8) comprised of a comfortably portable geometrically shaped quartered plate of combustible material having a variable plurality of horizontal apertures therethrough which extract additional evolving gases into immediate combustion for extra heat and which operates in an elevated vertical position between two parallel logs so to present a common lower crest (18A) which bifurcates into a symmetric divergent communal acclivity of surfaces (10), (12), and (14A) which rise into opposite common divergent convergent junctions (16) whereby symmetric surfaces (14B) rise convergently to terminate at vertical height in a common upper crest (18B) so that fire kindler (8) is easy to ignite and will convergently and prominently direct combustion into a hotter and steadier solitary flame whereby potential heat is aimed at a localized area of any intended fuel placed above it. Thus, developing a hot spot on the firewood which increases entropy and rate of ignition.

15 Claims, 2 Drawing Sheets

(56) References Cited

U.S. PATENT DOCUMENTS

| | | | | |
|---|---|---|---|---|
| 4,952,217 A * | 8/1990 | Porter | ............ | C10L 5/44 44/522 |
| 4,994,091 A * | 2/1991 | Dougherty | ............ | C10L 11/04 44/532 |
| 5,186,721 A | 2/1993 | Campana | | |
| 6,379,405 B1 | 4/2002 | Reiger et al. | | |
| 2002/0129808 A1 * | 9/2002 | Manner | ............ | C10L 5/40 126/45 |
| 2005/0023714 A1 * | 2/2005 | Manner | ............ | B01J 20/24 264/115 |
| 2005/0246946 A1 * | 11/2005 | Paplinski | ............ | A47J 37/079 44/544 |
| 2008/0134572 A1 * | 6/2008 | Cui | ............ | C10L 5/36 44/542 |
| 2009/0307968 A1 * | 12/2009 | Parker | ............ | B27B 1/005 44/535 |
| 2011/0126452 A1 * | 6/2011 | Blackmore | ............ | C10L 5/36 44/522 |
| 2011/0192078 A1 * | 8/2011 | Malone | ............ | C10L 5/36 44/532 |

* cited by examiner

FIRE KINDLER

CROSS-REFERENCE TO RELATED APPLICATIONS

This application is a CIP of patent application Ser. No. 13/506,841, filed 2012 May 17 by the present inventor, which is incorporated by reference and claims priority of PPA Ser. No. 61/571,258, filed 2011 Jun. 22.

BACKGROUND

Prior Art

The following is a list of relevant prior art:

U.S. Patents

U.S. Pat. No. 182,087 September 1876 Tylee
U.S. Pat. No. 201,184 March 1878 Lewis
U.S. Pat. No. 211,085 January 1879 Burnett
U.S. Pat. No. 213,768 April 1879 McShane
U.S. Pat. No. 286,103 October 1883 Wood et. al
U.S. Pat. No. 585,001 June 1897 McDonald
U.S. Pat. No. 829,072 August 1906 Hill
U.S. Pat. No. 2,007,694 July 1935 Rutherford
U.S. Pat. No. 3,346,352 October 1967 McCoy
U.S. Pat. No. 4,060,396(A) November 1977 Burton
U.S. Pat. No. 4,116,645 September 1978 Dalzell
U.S. Pat. No. 4,460,377 July 1984 Kalil
U.S. Pat. No. 4,781,128 November 1988 Salner
U.S. Pat. No. 4,952,217 August 1990 Porter
U.S. Pat. No. 5,186,721 February 1993 Campana
U.S. Pat. No. 6,379,405 April 2002 Reiger

Foreign Patent Documents

402838(A) December 1933 GB
839602(A) June 1960 GB
0018855(A1) May 2000 WO

Those familiar with any attempt to ignite a campfire are aware that certain outdoor conditions may often exist to hinder the effort. Damp wood and breezes are common outdoor conditions. To combat such conditions campers will often employ rather bulky and heavy fire kindlers. Such kindlers are awkward to carry and therefore, not conducive for use in hiking situations. So, they are usually used in close areas from the users' storage or vehicle.

Several types of bulky kindlers have been proposed and apertures are commonly considered with them. The aperture considerations of heretofore known kindlers have been meant to permit some passage of air to facilitate self-combustion so to achieve a prolonged burn duration and assist in the distribution of numerous flames across fire kindler surfaces. For example, U.S. Pat. No. 829,072 to Hill (1906) discloses such an intention. Also, U.S. Pat. No. 2,007,694 to Rutherford (1935) discloses air passage to aid combustion and flame spreading so to completely consume to ash. While U.S. Pat. No. 4,781,128 to Salner (1988) discloses an intention to maintain a long duration of combustion.

Many kindlers use waxes to sustain their bulk and flames. For example, U.S. Pat. No. 3,346,352 to McCoy (1967) discloses that the wax is intended to spread the flames over the surface of the article. Such of this type are commonly found in local markets today and many share in awkward bulk. If reduced to a portable size, these types become relatively less effective than their previous bulk.

Although functional, the heretofore known fire kindlers have numerous disadvantages:

a) Those with bulk, heaviness, and awkward shapes are not comfortably portable. Therefore, they are not conducive to hiking, biking, hunting and other active sports including survival type outings.

b) Their bulkiness can be detrimental to their operation as well. Bulky shapes produce a wide dispersal of potential heat. The heat potential is portioned out along the expanse of the extensive surfaces, resulting in numerous scattered flames. These random flames delivering less than their heat potential.

c) For success, the dispersed heat delivery of these fire kindlers relies upon various attempts to prolong the burn durations of self-combustion. The intention being, to last long enough to hopefully ignite a campfire.

d) In outdoor conditions kindlers with dispersed heat delivery and those with reduced sources are more easily extinguished. They can also be unsuccessful when the breeze repeatedly pushes their aimless heat away, or, when the intended firewood becomes or remains damp.

e). Kindlers which have stick shapes often become starved of combustible air as they are inadvertently sandwiched in stacked logs or crowded between pieces of intended firewood. Also, they quickly deteriorate during operation and collapse upon themselves or then fall out of effective range. Thus, they can be wasteful and less successful.

f) Waxy type kindlers allow for surprising messes from disturbances in transport. Becoming softer they become weak and then misshapen or even separated.

g) In operation waxy kindlers can have their heat delivery become even more dispersed. Often they fall apart during operation. Thus, spreading themselves thinner. Also, these waxes are most often of a petroleum base which is now considered environmentally undesirable.

h) Some kindlers purposely offer little, weak flames that will demand complicated work from the user.

i) Kindlers which possess very miniscule properties, such as those with strikers and flints, rely entirely upon the tedious expert work of the user for any success. Also, if comprised of moving parts these types may malfunction.

j) Even when used indoors damp wood may still be found among the intended firewood, making the attempt with the heretofore known kindlers less successful.

SUMMARY

In accordance with one embodiment a fire kindler has clean, comfortable, protective portability. Having ease of ignition and use, and a hot and steady solitary flame. Being comprised of an appropriately sized plate of combustible material having vertical attitude in operation and a sturdy geometrical shape of proportional thickness. One embodiment, enough to possess sufficient fuel and support a variable plurality of generally horizontal apertures, therethrough.

ADVANTAGES

Accordingly several advantages of one or more aspects of one embodiment of the applicant's fire kindler are as follows:

a) Desirable size, weight, and shape can be produced and packaged in comfortable and protective rigid pocket-tins.

b) Potential heat is drawn together into a solitary flame. A unified flame is developed which delivers the heat more consistently to a piece of firewood placed deliberately above it. There is less dispersal of heat. There is increased delivery of potential heat. A hot-spot is, thereby, created on the intended firewood. Whereby dampness evaporates.

c) Heat is directed to and remains more frequently upon a localized area. Thus, increasing a rate of entropy and increasing speed of ignition. Spreading flames and prolonging duration of combustion is not a principle of operation.

d) Outdoor conditions such as breezes and dampness of intended firewood are combated by a more steady confluent solitary flame.

e) A firm, compact shape of 100% natural resinous wood having sturdy proportions and specific intention, prescribes for a deliberate placement of the article.

f) The natural firmness of the combustible article and its rigid packaging, insure and protect a reliable operation of the kindler.

g) Reliable operation and the firmness of the 100% natural wood article assures for a more consistent, undispersed, and stationary delivery of potential heat by the solitary flame to the developing hot-spot. Local dampness quickly evaporates.

h) The reliable operation produces the solitary flame comprised of enhanced heat output and steadiness. Thus, the user is given strategic assistance.

i) The strategic assistance of the reliable operation supplies most of the work needed to establish a successful campfire ignition. Even if the firewood is damp. The kindler has no moving parts.

j) Being well suited for outdoor conditions, the kindler becomes more effective when used in indoor fireplaces. Even with damp wood.

Other advantages of one or more aspects of one embodiment will be apparent from a consideration of the drawings and ensuing description.

DRAWINGS

Figure 1:
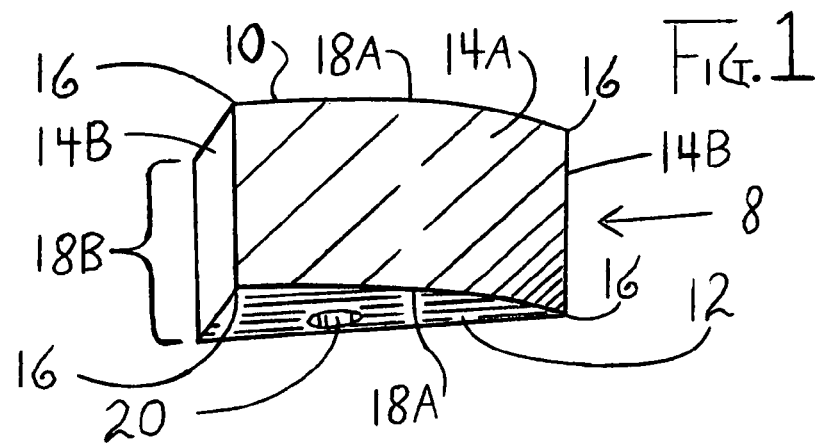
FIG. 1 is a bottom perspective view of one embodiment.
Figure 2:
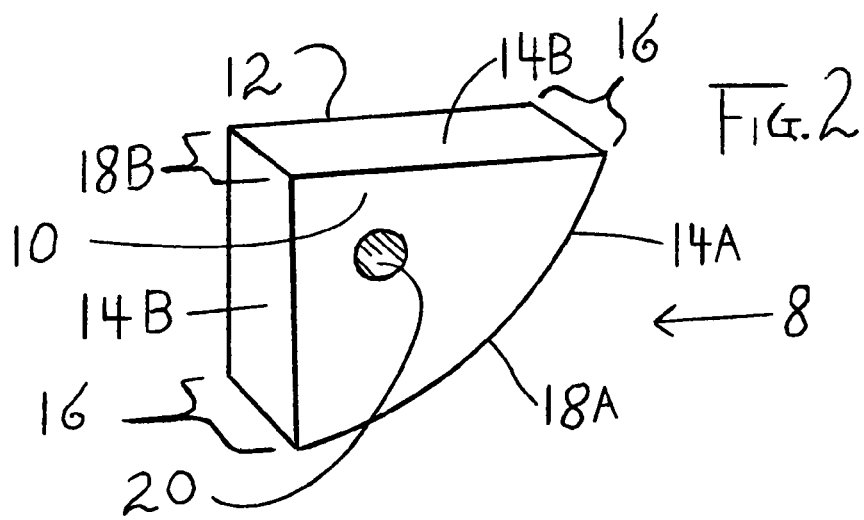
FIG. 2 is a side perspective view of one embodiment.
Figure 3:
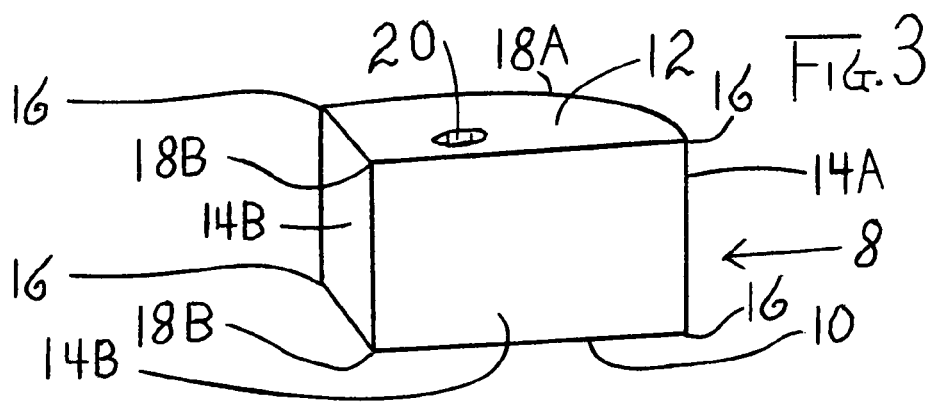
FIG. 3 is a top perspective view of one embodiment.

Reference Numerals 08 body of fire kindler
10 vertical side surface
12 opposite vertical side surface
14A divergent perpendicular perimeter communication surface
14B convergent perpendicular perimeter communication surface
16 common divergent convergent junction
18A common lower crest
18B common upper crest
20 aperture

DETAILED DESCRIPTION

FIGS. 1, 2, 3, and 4

One embodiment of a fire kindler is illustrated in FIGS. 1, 2, 3, and 4. Body of fire kindler 8 of FIGS. 1-4 is a geometrically shaped quartered plate configuration which, in one embodiment, is cut from an initial geometrically shaped parent plate of combustible material which is derived from abundantly available and nonendangered resinous pine trees. The initial plate is generally seven and one half centimeters in length and width with a two and one half centimeter thickness. The initial plate is cut along a cross-cut line, so that two equal, halved slabs are created. Then each halved slab is cross-cut perpendicularly from the middle of the original cross-cut line. Thus, the initial parent plate has been quartered. Therefore, each quartered plate, when applied in a vertical attitude, presents a common lower crest 18A of FIGS. 1-4. Lower crest 18A of FIGS. 1-4 is comprised of a symmetrically bifurcated divergent communal acclivity which is correlated with surfaces 10, 12, and 14A of FIGS. 1-4. At a terminal height of each divergent communal acclivity there is, accordingly, common divergent convergent junction 16 of FIGS. 1-4, which introduces surface 14A of FIGS. 1-4 into communication with surface 14B of FIGS. 1-4. Surface 14B comprised of a symmetric convergent communal acclivity which is correlated with surfaces 10 and 12 of FIGS. 1-4, and which is further correlated with common upper crest 18B of FIGS. 1-4 at a terminating vertical height of fire kindler 8.

The initial parent plate of the present fire kindler 8 may be derived by sawing transversely through tree limbs or tree trunks so to have logs of manageable size. Band saws or hole saws may then produce geometrically shaped blocks of the appropriate dimensions from these sources. Now, these block shapes may then be transversely cut to produce the appropriate thickness of fire kindler 8. Then, further processing may occur along with the equal halving and quartering, as has been described, so to produce the present fire kindler 8.

The body of fire kindler 8 has a variable plurality of horizontal apertures which extend completely therethrough. An arrangement of which, in one embodiment, is shown at the sufficient product of one cylindrical aperture 20, as fully shown in FIG. 4. Additional apertures are exact duplicates of each other. Therefore, a description of one aperture is applicable to another aperture that may exist in one embodiment.

It is therefore described that a boring tool having dimensions suitable to produce the aperture 20 of FIGS. 1-4 is mechanically sent completely through the body of fire kindler 8 of FIGS. 1-4 at a perpendicular attitude relative to vertical side surfaces 10 and 12 of FIGS. 1-4. Upon removal of the boring tool, the entire aperture 20 will be completed. And so shall it be done, with accordance, to any additional aperture of one embodiment.

Aperture introduction will be considerate of placement, proportion, and plurality relative to a physical stability of each 100% naturally varying composition of a fire kindler 8 body. Consideration will also be applied so to retain sufficient amounts of the 100% naturally varying quantities of resin that, in one embodiment, is indeed the combustible material of the body of fire kindler 8. Other embodiments of fire kindler 8 may have no apertures at all, due to these considerations. In the absence of apertures, fire kindler 8 will be most suitable for use in more benign environments such as indoor fireplaces and woodstoves.

Operation

Figure 4:
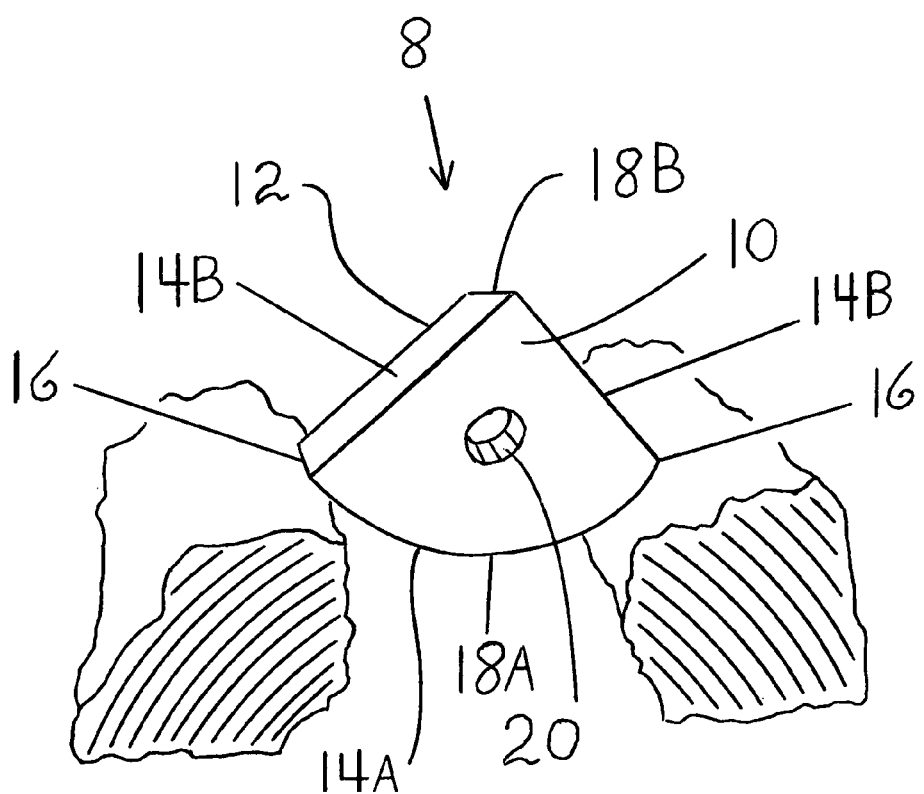
FIG. 4 is a front perspective view of one embodiment in which a proper position for use is shown.

In operation, of one embodiment, lower crest 18A should be substantially exposed and elevated at a height of approximately two and one half centimeters above any type of a base surface, so that surface 14A is facing downward. This may be achieved by deliberately placing body of fire kindler 8 in a vertical attitude between two parallel pieces of firewood, so that each junction 16 is placed so to rest in perpendicular communication with one of the opposite faces of the two parallel firewood pieces, as shown in FIG. 4.

Intended firewood should be of relative size in consideration of the quartered size of fire kindler 8. A firewood surface that is intended to be ignited should be deliberately positioned and supported, so to be adjustable, at approximately fifteen centimeters above common upper crest 18B of fire kindler 8.

This may be easily achieved by stacking a scaffold of horizontal firewood pieces closely up and around fire kindler 8. So, place two parallel pieces per horizontal level, with each level criss-crossing the other. Then, at the level of recommended height, horizontal firewood may be placed so to intentionally cross into a predicted path of a forthcoming solitary flame. In this way the flame tip may rise to stand and be locally applied immediately below the intended firewood surface. The height of that surface being easily adjusted, if necessary, from one scaffold level to another, so to maintain a strategic application of the solitary flame tip.

Once prepared, a single match, or the like, is applied along surface 14A at common lower crest 18A of the body of fire kindler 8. The resinous material of the kindler and the symmetric divergent communal acclivity quickly and cooperativly establish combustion. The body of fire kindler 8 becomes engulfed in flame.

Now, the symmetric communal acclivity of divergent perpendicular perimeter communication surface 14A and the correlating vertical side surfaces 10 and 12 direct and support an unobstructed flow of rising combustion. The symmetry of this rising-combustion is then drawn together by the, above, directing symmetric communal acclivity of convergent perpendicular perimeter communication surface 14B and the correlating vertical side surfaces 10 and 12. The symmetric convergent acclivities of convergent perpendicular perimeter communication surface 14B and the symmetric convergent acclivities of the correlating vertical side surfaces 10 and 12 serve to direct and support an unobstructed, smooth convergent fluence of combustion. The symmetry and fluent convergence of this combustion enhances a balance and solidarity in a unified flame, consolidating above common upper crest 18B. Thus, producing a more steady solitary flame.

The aperture of one embodiment is the cylindrical aperture 20. Whereby, during combustion, additional evolving combustible gases are easily extracted and exposed to exterior excess air along vertical side surfaces 10 and 12. Thus, immediately contributing to the production of heat. Thereby, in one embodiment, cooperatively establishing a hotter solitary flame.

During combustion the hotter and more steady solitary flame remains more constantly and returns more frequently, in breezy outdoor conditions, to a localized area on the intended firewood above it. Thereby, in one embodiment, a higher rate of entropy occurs and the ease at which the firewood ignites is, therefore, increased. Even if the firewood is damp. Even if the breezes blow.

CONCLUSION, RAMIFICATIONS, AND SCOPE

Thus, the reader will see that at least one embodiment of the fire kindler provides a device which functions in a utilitarian manner to produce a strategic result. One which enables a wide range of users to carry, comfortably in their pocket, a more reliable option for igniting a campfire. One which supplies an enhanced delivery of work needed for successful ignition of firewood. One which allows a greater quantity of a strategic use fire kindler to be carried at, substantially, the same weight as the original parent fire kindler plate and within the same comfortable rigid pocket-tin used by the original parent fire kindler plate. One which allows for a more sporting challenge to those who prefer to exercise and test their survival skills of outdoor fire building, by strategically using one quartered fire kindler plate at a time.

Although fire kindler 8 is particularly well adapted for outdoor excursions and conditions, it is considered that it can be substantially effective when used in benign conditions, such as indoor fireplaces and woodstoves.

While the above description contains many specificities, these should not be construed as limitations on the scope, but rather as an exemplification of one embodiment thereof.

Many other variations are contemplated. For example:
I can see changing the aperture into a conical shape;
I can see changing the aperture into a funnel shape;
I can see changing the angle of apertures into various inclines;
I can see changing the plurality of the apertures;
I can see eliminating the apertures completely;
I can see reducing the fire kindler proportions;
I can see enlarging the fire kindler proportions;
I can see cutting notches upon surface 14A so to facilitate ignition;
I can see bevelling the edges of surfaces 10 and 12;
I can see applying a generally 30 degree chamfer to aperture 20;
I can see embodiments of different types of geometrically shaped plates, such as square plates and other parallelepiped plates;
I can see embodiments of different types of combustible material;
I can see embodiments cast from molds;
I can see packaging conducive to multiple unit sales, especially for indoor fireplace and woodstove use.

Accordingly, the scope of the fire kindler should be determined not by the embodiment illustrated, but by the appended claims and their legal equivalents.

I claim:

1. A fire kindler comprised of a portable geometrically shaped quartered plate of combustible material having easy ignition, said geometrically shaped quartered plate having two vertical side surfaces, said geometrically shaped quartered plate further having a variable plurality of horizontal apertures passing completely therethrough, said two vertical side surfaces having divergent perpendicular perimeter communication surfaces between them, said two vertical side surfaces further having convergent perpendicular perimeter communication surfaces between them, said divergent perpendicular perimeter communication surfaces having a common lower crest, said common lower crest having symmetrically bifurcated divergent communal acclivities, each of said symmetrically bifurcated divergent communal acclivity having a common divergent convergent junction, each of said common divergent convergent junction having a symmetric convergent communal acclivity, said symmetric convergent communal acclivities having a common upper crest, said common upper crest having termination of vertical height of said geometrically shaped quartered plate, so to complete a smooth convergence of structure for aiming and directing potential heat to a reduced localized area above the fire kindler.

2. A fire kindler according to claim 1 wherein said geometrically shaped quartered plate is a quartered section of a geometrically shaped parent plate having length equal to width and a proportionally thin thickness.

3. A fire kindler according to claim 1 wherein said combustible material is 100% natural wood.

4. A fire kindler according to claim 1 wherein said two vertical side surfaces are two smooth symmetric vertical surfaces having perimeters comprised of said symmetrically bifurcated divergent communal acclivity.

5. A fire kindler according to claim 4 wherein said two vertical side surfaces further having perimeters comprised of said symmetric convergent communal acclivity.

6. A fire kindler according to claim 1 wherein said divergent perpendicular perimeter communication surface is a substantially smooth downward facing sloping surface having uniform width between said two vertical side surfaces whereby a perpendicular communication with the perimeter of each of said two vertical side surfaces is symmetrically and divergently correlated.

7. A fire kindler according to claim 1 wherein said convergent perpendicular perimeter communication surface is a substantially smooth upward facing sloping surface having uniform width between said two vertical side surfaces whereby a perpendicular communication with the perimeter of each of said two vertical side surfaces is symmetrically and convergently correlated.

8. A tire kindler according to claim 1 wherein said variable plurality of the horizontal apertures includes zero apertures.

9. A fire kindler according to claim 1 wherein said symmetrically bifurcated divergent communal acclivity is a correlation of the sloping surfaces of said divergent perpendicular perimeter communication surface and said two vertical side surfaces whereby each of the divergent sloping surfaces rises symmetrically from said common lower crest while having uniform correlation with the divergent perimeters of said two vertical side surfaces.

10. A fire kindler according to claim 1 wherein said common lower crest is an initiatory common junction whereby said symmetrically bifurcated divergent communal acclivities join at their lowest vertical position.

11. A fire kindler according to claim 1 wherein said easy ignition is provided by said common lower crest.

12. A fire kindler according to claim 1 wherein said common divergent convergent junction is two opposite transitional common junctions whereby said divergent perpendicular perimeter communication surfaces and the divergent acclivities of the perimeters of said two vertical side surfaces are introduced to said convergent perpendicular perimeter communication surfaces and said symmetric convergent communal acclivities of the convergent perimeters of said two vertical side surfaces.

13. A fire kindler according to claim 1 wherein said symmetric convergent communal acclivity is a correlation of the sloping surfaces of said convergent perpendicular perimeter communication surface whereby each of the sloping surfaces rise with symmetric convergence from each of said common divergent convergent junction while having uniform correlation with the convergent perimeters of said two vertical side surfaces.

14. A fire kindler according to claim 1 wherein said common upper crest is a terminating common junction whereby said symmetric convergent communal acclivities join at vertical height of said geometrically shaped quartered plate so to provide a final prominence of vertical structure in the plate for reducing and aiming the heat delivery dimensions of the fire kindler.

15. A fire kindler according to claim 1 wherein said portable geometrically shaped quartered plate is portable whereby each of said geometrically shaped quartered plates is the quartered section of the original geometrically shaped parent plate so that each of the quartered sections fits accordingly into a quarter area within a rigid pocket-tin which is conformative to the original geometrically shaped parent plate.

* * * * *